United States Patent
Martyak et al.

(10) Patent No.: US 8,236,069 B2
(45) Date of Patent: Aug. 7, 2012

(54) ACRYLIC POLYMER LOW TEMPERATURE FLOW MODIFIERS IN BIO-DERIVED FUELS

(75) Inventors: Nicholas M. Martyak, Doylestown, PA (US); Noah E. Macy, Royersford, PA (US); Michael D. Gernon, Phoenixville, PA (US); Scott C. Schmidt, West Chester, PA (US); Conor M. Dowling, Ambler, PA (US)

(73) Assignee: Arkema Inc., King of Prussia, PA (US)

( * ) Notice: Subject to any disclaimer, the term of this patent is extended or adjusted under 35 U.S.C. 154(b) by 286 days.

(21) Appl. No.: 12/601,341

(22) PCT Filed: Jun. 11, 2008

(86) PCT No.: PCT/US2008/066475
§ 371 (c)(1),
(2), (4) Date: Nov. 23, 2009

(87) PCT Pub. No.: WO2008/154558
PCT Pub. Date: Dec. 18, 2008

(65) Prior Publication Data
US 2010/0175310 A1    Jul. 15, 2010

Related U.S. Application Data

(60) Provisional application No. 60/943,094, filed on Jun. 11, 2007.

(51) Int. Cl.
*C10L 1/18* (2006.01)
(52) U.S. Cl. .................................. 44/397; 44/398
(58) Field of Classification Search ............. 44/398, 44/397
See application file for complete search history.

(56) References Cited

U.S. PATENT DOCUMENTS

| | | | |
|---|---|---|---|
| 3,462,249 A * | 8/1969 | Tunkel | 44/393 |
| 5,002,676 A | 3/1991 | Willis et al. | |
| 6,255,402 B1 | 7/2001 | Boutillier et al. | |
| 6,255,448 B1 | 7/2001 | Grimaldi et al. | |
| 6,350,723 B1 | 2/2002 | Mishra et al. | |
| 6,391,996 B1 | 5/2002 | Scherer et al. | |
| 6,409,778 B1 * | 6/2002 | Auschra et al. | 44/388 |
| 6,531,547 B1 | 3/2003 | Visger et al. | |
| 6,624,322 B1 | 9/2003 | Gillet et al. | |
| 7,906,468 B2 | 3/2011 | Schmidt et al. | |
| 2002/0040117 A1 | 4/2002 | Guerret et al. | |
| 2002/0188081 A1 | 12/2002 | Roos et al. | |
| 2004/0010072 A1 | 1/2004 | Krull et al. | |
| 2005/0107577 A1 | 5/2005 | Couturier et al. | |
| 2006/0185903 A1 * | 8/2006 | Schmidt et al. | 175/65 |
| 2006/0242892 A1 | 11/2006 | Siggelkov et al. | |
| 2007/0082827 A1 | 4/2007 | Schmidt et al. | |

FOREIGN PATENT DOCUMENTS
WO    WO 01/40339 A1    6/2001

OTHER PUBLICATIONS

Matyjaszewski, K., Comparison and Classification of Controlled/Living Radical Polymerization, American Chemical Society, 2000.
Goto, A. et al., Kinetic Studt on Nitroxide-Mediated Free Radical Polymerizationo of tert-Butyl Acrylate, Macromolecules, 1999, 32, 618-623.
Benoit, D. et al., Controlled Free-Radical Polymerization in the Presence of a Novel Asymmetric Nitroxyl Radical, Poly. Prepr. 1997, 38(1), 729-730.
Hawker, C. et al., Development of a Universal Alkoxyamine for Living Free Radical Polymerizations Using Combinatoral Techniques, Polym. PMater. Sci. Eng. 1999, 80, 90-91.
Hawker, C. et al. Initiating Systems for Nitroxide-Mediated "Living" Free Radical Plymerizations: Synthesis and Evaluation, Macromolecules, 1996, vol. 29, No. 16, 5245-5254.

* cited by examiner

*Primary Examiner* — Cephia D Toomer
(74) *Attorney, Agent, or Firm* — Steven D. Boyd

(57) ABSTRACT

The present invention relates to acrylic block polymers, either block copolymers or homopolymers, synthesized by a controlled free-radical process, and their use as low temperature flow modifiers in bio-derived fuel compositions. They are especially useful in modifying the low temperature flow behavior in bio-derived fuels. The acrylic polymers are especially useful as cold filter plugging control additives in bio-derived fuels.

2 Claims, No Drawings

ACRYLIC POLYMER LOW TEMPERATURE FLOW MODIFIERS IN BIO-DERIVED FUELS

FIELD OF INVENTION

The present invention relates to use of acrylic polymers, either block copolymers or homopolymers, synthesized by a controlled free radical process as additives and viscosity modifiers in bio-derived fuels such as biodiesel compositions. They are especially useful as pour point depressants, cold flow improvers and to lower the cold filter plugging point for biodiesel fuels.

BACKGROUND OF THE INVENTION

In view of decreasing world crude oil reserves and the discussion about the environmentally damaging consequences of the use of fossil and mineral fuels, there is increasing interest in alternative energy sources based on renewable raw materials. These include in particular natural oils and fats of vegetable or animal origin. These are generally triglycerides of fatty acids having from 10 to 24 carbon atoms and a calorific value comparable to conventional fuels, but are at the same time classified as biodegradable and environmentally compatible. In general, such oils contain glycerides from a series of acids whose number and type vary with the source of the oil, and they may additionally contain phosphoglycerides. Such oils can be obtained by processes known in the prior art.

US Patent Publication No. 2004/0010072 discloses the use of additives for improving the cold flow behavior of vegetable or animal fuel oils and to correspondingly additized fuel oils which contain fatty acid esters of monohydric alcohols which are derived, for example, from rapeseed oil, sunflower oil and/or soya oil and attain cold filter plugging point (CFPP) values of −20° C. and below which remain constant even when the oil is stored for a prolonged period in the region of its cloud point or below. The additive comprises ethylene copolymers, comb polymers and optionally polyalkyl (meth) acrylates and is a flow improver for such fatty acid esters.

Random copolymers made by ATRP have been used as pour point depressants (PPD) (U.S. Pat. No. 6,391,996), and viscosity index improvers for lubricating oil (US2002/0188081). The '996 patent mentions that the ATRP process could be used for blocky copolymers, but it fails to exemplify such a use, or disclose the benefits of using such block copolymers in bio-derived fuels.

The polymers disclosed in U.S. Pat. No. 6,391,996 are prepared via a controlled reaction described as using initiators having a transferable atomic group and a catalyst containing a transition metal (ATRP techniques). These types of polymerizations have several drawbacks including, but not limited to, slow polymerization kinetics, residual metallic byproducts, and limited polymer composition and molecular weight ranges. The residual metal catalysts can be detrimental for many applications as they influence the product properties and impact environmental compatibility.

These references do not disclose the use of a controlled architecture polymers having at least one pure acrylic block segment for use as a cold flow additives for bio-derived fuels.

U.S. Pat. No. 5,002,676 describes the preparation of block copolymers containing selectively hydrogenated conjugated dienes and t-butyl methacrylate. U.S. Pat. No. 6,350,723 teaches the synthesis of block copolymers through the living anionic polymerization of a conjugated diene and an alkyl methacylate monomer. These references exemplify the use of block copolymers containing conjugated dienes and hydrogenated dienes. These patents do not teach the significance of tailoring block composition or allow for the formation of gradient compositions. Furthermore, living anionic polymerization suffers from several drawbacks, such as, ineffectiveness at temperatures above −20° C., poor co-polymerization between polar and non-polar co-monomers, and the inability to use monomers that can be easily deprotanated. Therefore functional monomers cannot be incorporated, and the co-polymerization of monomer mixtures can be problematic and/or unusable. Furthermore this process can be expensive and difficult or impractical to carry out on an industrial scale as bulk or emulsion techniques cannot be used, extremely pure reagents are necessary (even trace amounts of protic material inhibits polymerization), and an inert atmosphere is requisite.

The use of acrylic block copolymers formed by a controlled-radical polymerization method to modifying the low temperature flow behavior in lubricating oils, including, but not limited to lowering the pour point is disclosed in US Patent Publication No. 2006/0185903.

A process for preparing copolymers in the presence of a stable free radical from the nitroxide family is described in U.S. Pat. No. 6,255,402. Nitroxide-mediated stable radicals have been used to produce controlled block copolymers, as described in U.S. Pat. No. 6,255,448, US 2002/0040117, and US Published Application No. 2005/0107577. These references, incorporated herein by reference, do not disclose the use of the copolymers in bio-derived fuels.

SUMMARY OF THE INVENTION

Surprisingly it has now been found that acrylic polymers, either block copolymers or homopolymers, formed by a controlled-radical polymerization method, are excellent at modifying the low temperature flow behavior in bio-derived fuels, including, but not limited to lowering the cloud point, lowering the pour point and lowering the cold filter plugging point. The polymers of the present invention, which have a low polydispersity index, produce a greater reduction of the cloud point, pour point and cold filter plugging point than found with random copolymers. While the properties attained in traditional copolymers are typically an average of the properties imparted by the resultant monomers incorporated, block copolymers lead to a material containing the characteristic properties inherent to the parent homopolymers comprising each segment. Therefore, the use of block copolymers is particularly adventitious for the formation of materials containing multifunctional properties. Furthermore, these polymers should provide enhanced shear stability due to the controlled molecular weights and molecular weight distribution provided by the controlled polymerization process.

It is an objective of the invention to provide a controlled-architecture polymer capable of improving the low temperature flow behavior of bio-derived fuels.

Another objective of the invention is to provide a bio-derived fuel with low temperature flow improvement by utilizing an acrylic polymer, either block copolymers or homopolymers.

Another objective of the invention is to provide a bio-derived fuel with low temperature flow improvement by utilizing an acrylic polymer, either block copolymers or homopolymers, prepared via controlled radical polymerization (CRP) techniques.

It is a further objective of the invention to adjust the copolymer composition and physical properties of a controlled-radical copolymer for the optimal low temperature flow improvement in a given bio-derived fuel.

It is also an objective of the invention to synthesize an acrylic polymer, either block copolymers or homopolymers, by a nitroxide-mediated polymerization process.

It is still a further objective of the invention to provide an acrylic polymer, either block copolymers or homopolymers, having multifunctional properties such as improved shear stability, pour point depression, cold flow improver, cold filter plugging point improver and reduced polydispersity index.

These objectives have been met in a bio-derived fuel composition comprising:
 a) from 99.999 to 30.0 weight percent of one or more bio-derived fuels, and
 b) from 0.001 to 70.0 weight percent of a controlled architecture polymer having at least one acrylic block.

DETAILED DESCRIPTION OF THE INVENTION

The present invention is directed to novel, controlled acrylic polymers, either block copolymers or homopolymers, which exhibit excellent low temperature performance in a wide variety of bio-derived fuels. As used herein bio-derived fuels refers to fuel oil, which is frequently also referred to as biodiesel or bio-fuel, a fatty acid alkyl ester made from fatty acids having from 14 to 24 carbon atoms and alcohols having from 1 to 4 carbon atoms. Typically, a relatively large portion of the fatty acids contains one, two or three double bonds. These are more preferably, for example, rapeseed oil acid methyl ester and especially mixtures which comprise rapeseed oil fatty acid methyl ester, sunflower oil fatty acid methyl ester and/or soya oil fatty acid methyl ester. The additives according to the invention can be used equally successfully in mixtures of fatty acid methyl esters and mineral oil diesel. Such mixtures preferably contain up to 25% by weight, in particular up to 10% by weight, especially up to 5% by weight, of fuel oil of animal or vegetable origin.

Examples of oils which are derived from animal or vegetable material and in which the additive according to the invention can be used include rapeseed oil, coriander oil, soya oil, cottonseed oil, sunflower oil, castor oil, olive oil, peanut oil, maize oil, almond oil, palm seed oil, coconut oil, mustard seed oil, bovine tallow, bone oil and fish oils. Further examples include oils which are derived from wheat, jute, sesame, shea tree nut, arachis oil and linseed oil. The fatty acid alkyl esters also referred to as biodiesel can be derived from these oils by processes known from the prior art. Rapeseed oil, which is a mixture of fatty acids partially esterified with glycerol, is preferred, since it is obtainable in large amounts and is obtainable in a simple manner by extractive pressing of rapeseeds. In addition, preference is given to the likewise widely available oils of sunflowers and soya, and also to their mixtures with rapeseed oil.

Useful low alkyl esters of fatty acids include the following, for example as commercially available mixtures: thyl, propyl, butyl and in particular methyl esters of fatty acids having from 12 to 22 carbon atoms, for example of lauric acid, myristic acid, palmitic acid, palmitolic acid, stearic acid, oleic acid, elaidic acid, petroselic acid, ricinolic acid, elaeostearic acid, linolic acid, linolenic acid, eicosanoic acid, gadoleinic acid, docosanoic acid or erucic acid, each of which preferably has an iodine number of from 50 to 150, in particular from 90 to 125. Mixtures having particularly advantageous properties are those which comprise mainly, i.e. comprise at least 50% by weight, methyl esters of fatty acids having from 16 to 22 carbon atoms, and 1, 2 or 3 double bonds. The preferred relatively low alkyl esters of fatty acids are the methyl esters of oleic acid, linoleic acid, linolenic acid and erucic acid.

Commercial mixtures of the type mentioned are obtained, for example, by hydrolyzing and esterifying animal and vegetable fats and oils by transesterifying them with relatively low aliphatic alcohols. To prepare relatively low alkyl esters of fatty acids, it is advantageous to start from fats and oils having a high iodine number, for example sunflower oil, rapeseed oil, coriander oil, castor oil, soya oil, cottonseed oil, peanut oil or bovine tallow. Preference is given to relatively low alkyl esters of fatty acids based on a novel type of rapeseed oil, more than 80% by weight of whose fatty acid component is derived from unsaturated fatty acids having 18 carbon atoms.

Particular preference is given to oils according to the invention which can be used as biofuels. Biofuels, i.e. fuels derived from animal or vegetable material, are regarded as being less damaging to the environment on combustion and are obtained from a renewable source. It has been reported that less carbon dioxide is formed on combustion than by an equivalent amount of crude oil distillate fuel, for example diesel fuel, and very little sulfur dioxide is formed. Certain derivatives of vegetable oil, for example those which are obtained by hydrolyzing and re-esterifying with a monovalent alkyl alcohol, can be used as a replacement for diesel oil. Equally suitable as fuels are also used cooking oils. It has been reported recently that mixtures of rapeseed oil esters, for example rapeseed oil methyl ester (RME), with crude oil distillate fuels in ratios of, for example, 10:90 (based on the volume) will be commercially obtainable in the near future. The additives according to the invention are also suitable for such mixtures.

A biofuel is therefore an oil which is obtained from vegetable or animal material or both or a derivative thereof which can be used as a fuel.

Although many of the above oils can be used as biofuels, preference is given to vegetable oil derivatives, and particularly preferred biofuels are alkyl ester derivatives of rapeseed oil, cottonseed oil, soya oil, sunflower oil, olive oil or palm oil, and very particular preference is given to rapeseed oil methyl ester.

The additive can be introduced into the oil to be additized in accordance with prior art processes. When more than one additive component or co-additive component is to be used, such components can be introduced into the oil together or separately in any desired combination.

To prepare additive packages for specific solutions to problems, the additives according to the invention can also be used together with one or more oil-soluble co-additives which alone improve the cold flow properties of crude oils, lubricant oils or fuel oils. Examples of such co-additives are polar compounds which effect paraffin dispersion (paraffin dispersants) and also oil-soluble amphiphils.

The additives according to the invention can be used in a mixture with paraffin dispersants. Paraffin dispersants reduce the size of the paraffin crystals and have the effect that the paraffin particles do not separate but remain dispersed colloidally with a distinctly reduced tendency to sedimentation. Useful paraffin dispersants have proven to be oil-soluble polar compounds having ionic or polar groups, for example amine salts and/or amides, which are obtained by reacting aliphatic or aromatic amines, preferably long-chain aliphatic amines, with aliphatic or aromatic mono-, di-, tri- or tetracarboxylic acids or their anhydrides. Other paraffin dispersants are copolymers of maleic anhydride and alpha, beta unsaturated compounds which may optionally be reacted with primary monoalkylamines and/or aliphatic alcohols, the reaction products of alkenyl-spiro-bislactones with amines and, according to, reaction products of terpolymers based on alpha, beta unsaturated dicarboxylic anhydrides, alpha, beta unsaturated compounds and polyoxyalkylene ethers of lower unsaturated alcohols.

Apart from in the fuel oils of animal or vegetable origin described, the additives according to the invention can also be used in mixtures of such oils with middle distillates. Biodiesel fuels can comprise 100% bioderived components or mixtures of bioderived components and petroleum derived components such as middle distillates. The mixing ratio between the biofuel oils and middle distillates may be between 1:99 and 99:1. Particular preference is given to biofuel:middle distillate mixing ratios of from 1:99 to 10:90.

Middle distillates are in particular mineral oils which are obtained by distilling crude oil and boil in the range from 120° to 450° C., for example kerosene, jet fuel, diesel and heating oil. Preference is given to using those middle distillates which comprise 0.05% by weight of sulfur and less, more preferably less than 350 ppm of sulfur, in particular less than 200 ppm of sulfur and in special cases less than 50 ppm of sulfur. These are generally those middle distillates which have been subjected to refining under hydrogenating conditions and therefore contain only small fractions of polyaromatic and polar compounds. They are preferably middle distillates which have 95% distillation points below 370° C., in particular below 350° C. and in special cases below 330° C. Synthetic fuels, as obtainable, for example, by the Fischer-Tropsch process, are also suitable as middle distillates.

The additives can be used alone or else together with other additives, for example with other pour point depressants or dewaxing assistants, with corrosion inhibitors, antioxidants, sludge inhibitors, dehazers and additives for reducing the cloud point.

Furthermore, the specific composition of the corresponding polymers can be tailored accordingly based on the bio-derived fuel utilized to attain the desired low temperature flow modification behavior.

The block copolymers of the present invention find use, among other things, as modifying the low temperature flow behavior of bio-derived fuel formulations. Bio-derived fuel useful in the invention include, but are not limited to, biodiesel, biodiesel/bioalcohol blends, biodiesel/petroleum diesel blends etc. In one preferred case, these block copolymers may be solubilized in bio-derived fuel compositions. The bio-derived fuel makes up from 60 to 99.999 percent by weight of the oil composition, preferably from 80 to 99.99 percent.

By "copolymers" as used herein, is meant polymers formed from at least two chemically distinct monomers as will be evident to those skilled in the art. The copolymer includes terpolymers and those polymers formed from more than three monomers.

Block copolymers of the present invention are those formed by controlled radical polymerization (CRP). They differ from random copolymers that may contain some blocks of certain monomers related either to a statistical distribution, or to the differences in reaction rates between the monomers. In these random polymerizations, there is no control over the polymer architecture, molecular weight, or polydispersity and the relative composition of the individual polymer chains is non-uniform. Included as block copolymers of the present invention are diblock copolymers, triblock copolymers, multiblock copolymers, star polymers, comb polymers, gradient polymers, and other polymers having a blocky structure, which will be known by those skilled in the art. Furthermore, each block segment may consist of a pure homopolymer segment (one monomer), or may be a copolymer of two or more different monomers.

When a copolymer segment is synthesized using a CRP technique such as nitroxide-mediated polymerization, it is termed a gradient or 'profiled' copolymer. This type of copolymer is different than a polymer obtained by a traditional free radical process and will be dependant on the monomer composition, control agent, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization, thus the composition is uniform and is dependant on the corresponding monomer mix with respect to the reaction time. Thus in a two monomer system where one monomer reacts faster than the other, the distribution or 'profile' of the monomer units will be such that one monomer unit is higher in concentration at one end of the polymer segment. Block copolymers of this invention may contain a block that is a gradient copolymer.

The copolymers of the invention are acrylic block copolymers. By acrylic block copolymer, as used herein, is meant that at least one block of the copolymer is formed entirely or almost entirely from one or more acrylic monomers. The acrylic block contains at least 51 mole percent of acrylic monomer units and preferably at least 90 mole percent. In one preferred embodiment, the acrylic block contains 100 percent acrylic monomer units. The other block or blocks may be acrylic or non-acrylic.

By "acrylic" as used herein is meant polymers or copolymers formed from acrylic monomers including, but not limited to, acrylic acids, esters of acrylic acids, acrylic amides, and acrylonitiles. It also includes alkacryl derivatives, and especially methacryl derivative. The use of the term "(meth) acylates" herein will be used to describe both esters of acrylic acid and methacrylic acid as will be evident to those skilled in the art. Functional and fluorinated (meth)acrylate monomers are also included. Examples of useful acrylic monomers include, but are not limited to acrylic acid; methacrylic acid; alkyl esters and mixed esters of (meth)acrylic acid; acrylamide, methacrylamide, N- and N,N-substituted (meth)acrylamides, acrylonitrile, maleic acid, fumaric acid, crotonic acid, itaconic acid and their corresponding anhydrides, carbonyl halides, amides, amidic acids, amidic esters, and the full and partial esters thereof. Especially preferred acrylic monomers include methyl acrylate, ethyl acrylate, butyl acrylate, and $C_6$-$C_{30}$ alkyl (meth)acrylates, and mixtures thereof.

The other block or blocks of the copolymer may be acrylic, or formed from one or more non-acrylic ethylenically unsaturated monomers. Other ethylenically unsaturated monomers useful in the invention include, but are not limited to, anhydrides, vinyl esters, alpha-olefins, substituted or unsubstituted mono and dialkyl esters of unsaturated dicarboxylic acids, vinyl aromatics, cyclic monomers, monomers containing alkoxylated side chains, sulfonated monomers, dienes, and vinyl amide monomers. Acrylic monomers may also be used at any level. A combination of ethylenically unsaturated monomers may also be used. In one preferred embodiment all blocks of the copolymer are acrylic blocks.

In principle, any living or controlled polymerization technique can be utilized. However, for the practicality of controlling acrylics, and creating copolymer segments of different polarities (including functional acrylics) the block copolymers of the present invention are preferably formed by controlled radical polymerization (CRP). These processes generally combine a free-radical initiator species with a free radical stabilizing compound to control the polymerization process and produce polymers of a specific composition, and having a controlled molecular weight and narrow molecular weight range.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

One preferred method of controlled radical polymerization is nitroxide-mediated CRP. Nitroxide-mediated syntheses can occur in bulk, solvent, and aqueous polymerization, can be used in existing equipment at reaction times and temperature similar to other free radical polymerizations. One advantage of nitroxide-mediated CRP is that the nitroxide is generally innocuous and can remain in the reaction mix, while other CRP techniques require the removal of the control compounds from the final polymer.

The mechanism for this control may be represented diagrammatically as below:

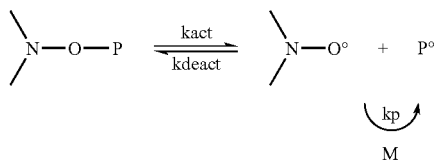

with M representing a polymerizable monomer and P representing the growing polymer chain.

The key to the control is associated with the constants $K_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ too high or when the ratio $k_{deact}/k_{act}$ is too low though, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

The nitroxide-mediated CRP process is described in, U.S. Pat. Nos. 6,255,448 and 6,665,043, US 2002/0040117, and US Published Application No. 2005/0107577, incorporated herein by reference. The above-stated patents describe the nitroxide-mediated polymerization by a variety of processes. Each of these processes can be used to synthesize polymers described in the present invention.

In one process the free radical polymerization or copolymerization is carried-out under the usual conditions for the monomer or monomers under consideration, as known to those skilled in the art, with the difference being that a β-substituted stable free radical is added to the mixture. Depending on the monomer or monomers which it is desired to polymerize, it may be necessary to introduce a traditional free radical initiator into the polymerization mixture as will be evident to those skilled in the art.

Another process describes the polymerization of the monomer or monomers under consideration using a alkoxyamine obtained from β-substituted nitroxides of formula (I) wherein A represents a mono- or polyvalent structure and $R_L$ represents a mole weight of more than 15 and is a monovalent radical, and $n \geqq 1$.

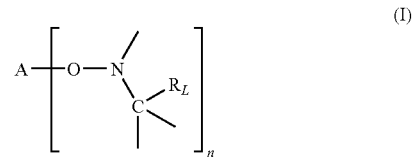

Another process describes the formation of polyvalent alkoxyamines of formula (I), based on the reaction of multifunctional monomers, such as, but not limited to, acrylate monomers and alkoxyamines at controlled temperatures. The multifunctional alkoxyamines of formula (I), wherein $n \geqq 2$, may then be utilized to synthesize multiblock, star and branched polymeric and copolymeric materials from the monomer or monomers under consideration.

Another process describes the preparation of multimodal polymers where at least one of the monomers under consideration is subjected to free radical polymerization in the presence of several alkoxyamines comprising the sequence of formula (I), wherein n is a non-zero integer and the alkoxyamines exhibit different values of n.

The alkoxyamines and nitroxyls (which nitroxyls may also be prepared by known methods separately from the corresponding alkoxyamine) as described above are well known in the art. Their synthesis is described for example in U.S. Pat. No. 6,255,448 and WO 00/40526.

In some embodiments of the invention, the alkoxyamine is one which produces the N-tert-butyl-N-[1-diethylphosphono-(2,2-dimethylpropyl)]nitroxide (DEPN) radical shown in formula II. One particularly effective class of nitroxide sources includes compounds such as iBA-DEPN, shown below in formula III, where the DEPN radical is linked to an isobutyric acid radical or an ester or amide thereof. If esters or amides are used, they are preferably derived from lower alkyl alcohols or amines, respectively.

DEPN Nitroxide:

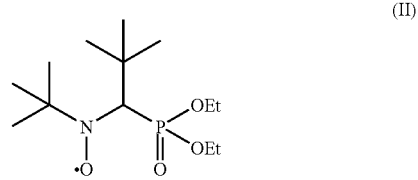

iBA-DEPN Alkoxyamine:

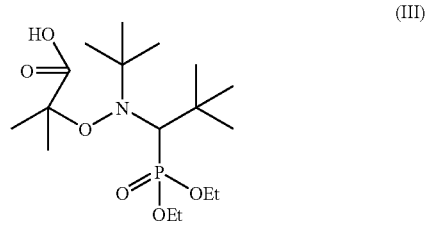

The alkoxyamines of formula (I) according to the present invention may be used for the polymerization and copolymerization of any monomer containing a carbon-carbon double bond, which is capable of undergoing free-radical polymerization. The control over these reactions will be dictated by the kinetic parameters described earlier. The polymerization or copolymerization is performed under the usual conditions known to those skilled in the art, taking into account the monomer(s) under consideration. Thus, the polymerization or copolymerization may be performed in bulk, in solution, in emulsion or in suspension, at temperatures ranging from 0° C. to 250° C. and preferably ranging from 25° C. to 150° C., without any limitation intended by this. Monomers which may be used according to the present invention, mention will be made of vinylaromatic monomers such as styrene, substituted styrenes, dienes, acrylic monomers such as alkyl or aryl acrylates and methacrylates, optionally containing fluorine, for instance methyl acrylate, butyl acrylate, octyl acrylate, lauryl acrylate, or lauryl methacrylate, and acrylamides such as N,N-dimethylacrylamide. This method works especially well for styrenics, acrylates, acrylamides, methacrylates and dienes. Monomers containing functional groups, such as epoxy, hydroxyl, and acid monomers are also easily polymerized by this method.

The alkoxyamines (I) according to the present invention may also be used for the synthesis of "sequenced" block copolymers according to a procedure which consists in carrying out, in a first step, the bulk, solution, suspension or emulsion polymerization of a monomer M1 or a mixture of monomers containing a carbon-carbon double bond capable of undergoing free-radical polymerization in the presence of a alkoxyamine (I) at a temperature ranging from 25° C. to 250° C. and preferably ranging from 25° C. to 150° C., and then, in a second step, allowing the temperature to fall and optionally evaporating off the residual monomer(s), and then, in a third step, introducing the monomer M2 or a new mixture of monomers into the reaction medium obtained above, and then resuming the polymerization by simply raising the temperature.

Polymers made by the nitroxide-mediated process will have some level of nitroxide end groups and the A group from Formula I at the other end or in the center of the corresponding block. These relatively innocuous nitroxide end-groups can remain on the end of the polymer chains or be removed by an additional processing step.

The nitroxide-mediated polymerization may be used to form homopolymers or block copolymers, which of the present invention are diblock copolymers, triblock copolymers, multiblock copolymers, star polymers, comb polymers, gradient polymers, and other polymers having a blocky structure, which will be known by those skilled in the art. The multiblock and triblock copolymers may consist of two chemically discrete segments, such as in A-B-A triblocks or multiblocks of the formula $(A-B)_n$, where n is >1 and A and B represent chemically distinct block segments. Or they may contain 3 or more chemically distinct blocks, such as A-B-C triblocks or A-B-C-D multiblock copolymers. The star polymers may contain from 3 to 12 arms, more preferably 3 to 8 and these arms may consist of or diblock, triblock, or multiblock copolymers. These aforementioned structures will be evident to those skilled in the art. Each block segment defined above may consist of a homopolymer, a random copolymer or may be comprised as a gradient copolymer of two or more different monomers.

The polymers of the present invention have a controlled molecular weight and molecular weight distribution. Preferably the molecular weight of the polymer is from 1,000 to 1,000,000 g/mol, and most preferably from 5,000 to 300,000 g/mol. The molecular weight distribution, as measured by $M_w/M_n$ or polydispersity is generally less than 4.0, and preferably below 3.0.

The block copolymers may also be produced in tandem with traditional free radical processes. For example, during a controlled polymerization, a traditional free radical source can be added to the reaction creating a mixture of controlled and non-controlled polymers. These free radical sources will be those known in the art, including but not limited to, peroxy compounds, peroxides, hydroperoxides and azo compounds, which decompose thermally to provide free radicals.

One embodiment of the invention is a bio-derived fuel composition containing acrylic polymer, either block copolymers or homopolymers, with improved low temperature flow properties. These polymers will be useful as cold flow improvers and cold filer plugging modifiers. The polymers may be used independently, or as a blend with traditional polymers. In the bio-derived fuel composition, a variety of additives may also be present in addition the base oil and polymers mentioned above, including but not limited to detergents, anti-foaming agents, viscosity index improvers, cetane improvers, and anti-corrosion agents.

Due to the control over molecular weight and narrow molecular weight distribution, these polymers exhibit enhanced shear stability. The use of long chain alkyl (meth) acrylates will allow for improved low temperature properties. These low temperature properties will be evident in viscosity tests, such as capillary rheometry, diesel fuel injector test (for shear stability), Brookfield viscometry, ASTM2983-02a: Low-Temperature Viscosity of Lubricants etc.

The polymer is present in a bio-derived fuel composition at from 0.001 to 40.0 percent by weight, and preferably from 0.01 to 20.0. The level of polymer used will depend on the end-use location, application, and the base oils utilized. Excellent low temperature properties improvement has been found using the acrylic copolymers of the present invention.

Because of the large low temperature properties improvement of these polymers, bio-derived fuel having superior flow can be formulated at similar polymer levels to those currently used, or flow improvement similar to that of currently used flow modifiers can be achieved at lower levels of the polymer of the present invention. While not being bound by any particular theory, it is believed that the blocky nature of the present copolymers leads to the large low temperature flow improvement.

The bio-derived fuels of the present invention can be optimized based on several characteristics of the polymers, including but not limited to, polymer molecular weight, block lengths, proper selection of monomer or monomer mixture in each segment, and polymer chain architecture.

EXAMPLES

The controlled architecture block copolymers were synthesized using the following generic protocol. Molecular weights were targeted by manipulating the monomer-to-initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the monomer under vacuum. The polymer examples were run neat or in solution. Typical solvents used included, toluene, ethyl benzene, butyl acetate, methyl ethyl ketone and directly in lubricating oils. Polymerizations were carried out at ambient pressures or run under nitrogen pressure up to 60 psi. Polymerizations were run in standard polymerization vessels both with and without shearing capacity, although adequate mixing capabilities were preferred.

The target block copolymers were prepared by various traditional monomer addition and polymer isolation protocols, as generically described below and will be evident to those skilled in the art, dependant on the desired final block composition. For example, pure block copolymers were prepared by evaporating or filtering off the residual monomer upon completion of the first block synthesis, subsequently followed by the addition of a second monomer composition different from the first. This second monomer composition then undergoes polymerization. This procedure may be repeated to obtain multiblock copolymers. Gradient block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Synthesis of the copolymers of the invention is illustrated by reference to example 1 below. Other copolymers of this invention can be prepared in an analogous manner, as it will be evident to those skilled in the art.

Mono-Alkoxyamine Initiator

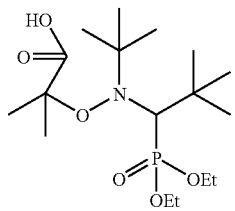

Example 1

Polymer Synthesis

Synthesis of an A-B block copolymer. The A block is polylauryl acrylate (PLA) and the B block is a gradient copolymer of polystearyl methacrylate and polylauryl acrylate (PLA-co-PSMA). For A-B block copolymer: 430 g (1.6 mol) of 90% pure lauryl acrylate (LA) (available from Sartomer) was added to a stainless steel resin kettle under nitrogen and brought to 50° C. 2.755 g mono-alkoxyamine initiator (7.22 mmol) was added to the heated lauryl acrylate using 42 g of toluene. The mixture was polymerized at 116-120° C. for 4 hours under nitrogen, reaching 67% conversion of LA monomer.

The reaction is then cooled to room temperature. The resultant PLA first block has a Mw=40,000 g/mol, and Mn=25,900 g/mol as determined by SEC analysis and referenced to polystyrene standards. This was used as a first block solution without further purification.

The second block was a gradient copolymer. To 66.7 g of the mixture above (44 g PLA polymer and 22 g LA monomer), was added 20.0 g of stearyl methacrylate (SMA) monomer and 15 g of toluene. This was then added to a heated 100 ml glass reactor and polymerized at 115° C. for 4 hours, under nitrogen, to form the gradient diblock copolymer (Arkema 57). Several other polymer variations of Arkema 57 were prepared as described below.

1.1) Alternatively, 66.7 g of the PLA first block mixture was added to 5.0 g of SMA with 15 g of toluene and polymerized at 115° C. for 4 hours (Arkema 50).

1.2) Alternately 66.7 g of the mixture was added to 20.0 g of dodecyl methacrylate with 15 g of toluene and polymerized at 114° C. for 4 hours (Arkema 55).

1.3) Alternately, 66.7 g of the mixture was added to 5.152 g of C18-22 acrylate with 15 g of toluene and polymerized at 114° C. for 4 hours. (Arkema 51)

Example 2

PLA-b-PSMA

An analogous A-B block copolymer was prepared in which the A block is polylauryl acrylate (PLA) and the B block is a pure block of polystearyl methacrylate (PSMA). A solvent washing procedure removed the residual monomer from the first block PLA from example 1. The neat PLA was then dissolved in toluene (approximately equal weight) prior to adding to the heated stearyl methacylate monomer solution. This protocol resulted in a pure block copolymer of PLA and PSMA.

Example 3

Mixtures of controlled and traditional non-controlled polymers were also prepared. For instance, following example 1.0 through 1.3, after the $2^{nd}$ block reaches 60% conversion, a traditional initiator source, Luperox 575, (available from Arkema Inc of Philadelphia, Pa.) was added to the reaction mixture at 2 wt % with respect to residual monomer. The reaction mixture was held at 115° C. for 1-2 hours, leaving the residual monomer at <1 wt %. This step provides a blend of controlled and non-controlled polymers. These polymers were isolated by removing the toluene under vacuum.

The cold flow properties of polymers in accordance with the present invention were tested in as follows, 0.1% of the polymer additive was added to B100 or blends of biodiesel with petrodiesel. Cloud point (CP) and pour point (PP) were determined using a water/glycol recirculating bath. Biodiesel or biodiesel blends were placed in glass vials and slowly cooled until the solution became gelatinous (CP) or completely frozen (PP).

Example 4

The CP and PP of B100 (pure biodiesel made from soybean oil) were −2.5° C. and −5.0° C., respectively. The addition of 0.1% of a block co-polymer based on a first block containing 20,000 grams per mole lauryl acrylate and a second block containing 40,000 grams per mole behenyl acrylate prepared via CRP polymerization techniques lowered the CP to −8.0° C. and the PP to −10° C.

Example 5

The CP and PP of B50 (50% petrodiesel and 50% biodiesel) were −17° C. and −20° C., respectively. The addition of 0.1% of a block co-polymer based on a first block containing 20,000 grams per mole lauryl acrylate and a second block containing 20,000 grams per mole behenyl acrylate prepared via CRP polymerization techniques lowered the CP to −21° C. and the PP to −33° C.

Example 6

The CP and PP of B20 (80% petrodiesel and 20% biodiesel) were −17° C. and −22° C., respectively. The addition of 0.1% of a block co-polymer based on a first block containing 10,000 grams per mole lauryl acrylate and a second block containing 40,000 grams per mole behenyl acrylate prepared via CRP polymerization techniques lowered the CP to −21° C. and the PP to −29° C.

Example 7

The CP and PP of B2 (98% petrodiesel and 2% biodiesel) were −19° C. and −24° C., respectively. The addition of 0.1% of a block co-polymer based on a first block containing 20,000 grams per mole lauryl acrylate and a second block containing 40,000 grams per mole behenyl acrylate prepared via CRP polymerization techniques lowered the CP to −22° C. and the PP to −34° C.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

What is claimed is:

1. An bio-derived fuel composition comprising
    a) from 99.999 to 30 weight percent of one or more bio-derived fuels; and
    b) from 0.001 to 70 weight percent of an acrylic block copolymer formed by a nitroxide-mediated controlled free radical polymerization process having at least one acrylic block formed from all acrylic monomer;
    wherein said bio-derived fuel composition has a cloud point and pour point lower than the cloud point and pour point of the bio-derived fuel alone.

2. The bio-derived fuel composition of claim 1 comprising from 0.01 to 20 weight percent of said acrylic block copolymer.

* * * * *